(12) United States Patent
Tokudome

(10) Patent No.: US 12,386,049 B2
(45) Date of Patent: Aug. 12, 2025

(54) ULTRASONIC OBJECT DETECTION DEVICE

(71) Applicant: U-SHIN LTD., Nagano (JP)

(72) Inventor: Tetsuo Tokudome, Hiroshima (JP)

(73) Assignee: U-SHIN LTD., Nagano (JP)

( * ) Notice: Subject to any disclaimer, the term of this patent is extended or adjusted under 35 U.S.C. 154(b) by 93 days.

(21) Appl. No.: 18/546,320

(22) PCT Filed: Feb. 7, 2022

(86) PCT No.: PCT/JP2022/004645
§ 371 (c)(1),
(2) Date: Aug. 14, 2023

(87) PCT Pub. No.: WO2022/176669
PCT Pub. Date: Aug. 25, 2022

(65) Prior Publication Data
US 2024/0142593 A1 May 2, 2024

(30) Foreign Application Priority Data
Feb. 19, 2021 (JP) .................... 2021-025559

(51) Int. Cl.
*G01S 7/521* (2006.01)
*B60R 13/04* (2006.01)
*G01S 15/931* (2020.01)

(52) U.S. Cl.
CPC ............ *G01S 7/521* (2013.01); *G01S 15/931* (2013.01); *B60R 13/04* (2013.01)

(58) Field of Classification Search
None
See application file for complete search history.

(56) References Cited

U.S. PATENT DOCUMENTS 10,393,864 B2 * 8/2019 Esmail ................. G10K 11/002
2005/0013140 A1 * 1/2005 Currie ..................... B60Q 1/32
362/495

(Continued)

FOREIGN PATENT DOCUMENTS

DE 102017108341 A1 * 10/2018 ........... G01S 15/931
DE 102018100121 A1 * 7/2019 ........... G01S 15/931

(Continued)

OTHER PUBLICATIONS

International Search Report for corresponding International Application No. PCT/JP2022/004645 mailed Apr. 26, 2022.

(Continued)

*Primary Examiner* — Fekadeselassie Girma
(74) *Attorney, Agent, or Firm* — Chrisman Gallo Tochtrop LLC

(57) ABSTRACT

An ultrasonic object detection device includes a vibrating plate made of resin, an ultrasonic sensor, and an ultrasonic absorber. The vibrating plate made of resin is disposed outside a door that opens and closes an opening part of a vehicle body so as to extend in the vehicle length direction. The ultrasonic sensor is disposed on an inner surface of the vibrating plate, and can transmit and receive an ultrasonic wave. The ultrasonic absorber is disposed so as to cover the inner surface of the vibrating plate including the ultrasonic sensor.

10 Claims, 7 Drawing Sheets

(56) References Cited

U.S. PATENT DOCUMENTS

| | | | | |
|---|---|---|---|---|
| 2008/0307888 A1* | 12/2008 | Yoshioka | ............... | G10K 11/02 |
| | | | | 73/627 |
| 2020/0072976 A1* | 3/2020 | Arndt Dr habil | ...... | G08G 1/168 |
| 2020/0247307 A1* | 8/2020 | Tsutsumi | ................ | B60R 11/04 |
| 2023/0076313 A1* | 3/2023 | Cogswell | ............. | B60Q 1/0035 |

FOREIGN PATENT DOCUMENTS

| | | | | |
|---|---|---|---|---|
| DE | 102018102350 A1 * | 8/2019 | ........... | G01S 15/878 |
| DE | 102019117315 A1 * | 12/2020 | ............. | G01S 15/10 |
| KR | 20070040712 A * | 4/2007 | ............. | G01D 11/30 |

OTHER PUBLICATIONS

Written Opinion for corresponding International Application No. PCT/JP2022/004645 dated Apr. 26, 2022.

\* cited by examiner

ULTRASONIC OBJECT DETECTION DEVICE

CROSS-REFERENCE TO RELATED APPLICATIONS

This is a national phase application in the United States of International Patent Application No. PCT/JP2022/004645 with an international filing date of Feb. 7, 2022, which claims priority of Japanese Patent Application No. 2021-025559 filed on Feb. 19, 2021 the contents of which are incorporated herein by reference.

TECHNICAL FIELD

The present invention relates to an ultrasonic object detection device.

BACKGROUND ART

An ultrasonic object detection device for avoiding collision of a door of a vehicle with an obstacle during an opening operation is known. The ultrasonic object detection device includes an ultrasonic sensor capable of transmitting and receiving an ultrasonic wave. The time from the transmission of the ultrasonic wave by the ultrasonic sensor until the ultrasonic wave reflected by the object is received by the ultrasonic sensor is measured, and the presence or absence of the obstacle and the distance to the obstacle are detected based on the time.

U.S. Pat. No. 10,393,864 B discloses an ultrasonic sensor assembly in which a sensor is disposed inside a panel of a door without providing an opening in the door to improve vehicle design.

SUMMARY OF THE INVENTION

Problems to be Solved by the Invention

When the ultrasonic sensor is disposed in the door of the vehicle without providing the opening as described above, the outer panel (generally made of a steel plate) of the door blocks a part of the transmitted ultrasonic wave, and the transverse wave remains in the outer panel. The ultrasonic sensor continues to sense the transverse waves remaining on the outer panel until they attenuate. As a result, the ultrasonic sensor cannot distinguish between the longitudinal wave reflected by the obstacle and returning and the transverse wave remaining on the outer panel, and it may be difficult to detect the obstacle.

In the ultrasonic sensor assembly described in U.S. Pat. No. 10,393,864 B, a damping member (damping material) is provided to attenuate a transverse wave remaining on the outer panel. As a result, the residual of the transverse wave in the outer panel is suppressed, and the sensitivity of reception can be improved. However, a damping member is required to obtain sufficient reception sensitivity, and the configuration of the ultrasonic sensor assembly is complicated.

An object of the present invention is to provide an ultrasonic object detection device capable of reliably detecting an object while simplifying a configuration.

Solutions to the Problems

The present invention provides an ultrasonic object detection device including: a vibrating plate made of resin and disposed to extend in a vehicle length direction outside a door that opens and closes an opening part of a vehicle body; an ultrasonic sensor disposed on an inner surface of the vibrating plate and capable of transmitting and receiving an ultrasonic wave; and an ultrasonic absorber disposed so as to cover the inner surface of the vibrating plate, including the ultrasonic sensor.

In general, transverse waves are less likely to remain in a resin material. Therefore, even when, for example, no damping member is provided on the vibrating plate, interference between a reflected wave (longitudinal wave) reaching the vibrating plate and a transverse wave remaining on the vibrating plate is suppressed or prevented, and the ultrasonic sensor can reliably receive the reflected wave. In addition, since the ultrasonic absorber is provided on the inner surface of the vibrating plate, it is possible to prevent an ultrasonic wave traveling toward the inside of the vibrating plate (door side) among ultrasonic waves generated by vibration of the vibrating plate from being reflected by the door and received by the vibrating plate. That is, erroneous detection can be prevented. As described above, it is possible to reliably detect an object around the vehicle without providing a damping material for attenuating a transverse wave in the vibrating plate, that is, while simplifying the configuration of the ultrasonic object detection device.

Effects of the Invention

According to the ultrasonic object detection device of the present invention, it is possible to reliably detect an object while simplifying the configuration.

DETAILED DESCRIPTION

First Embodiment

Figure 1:
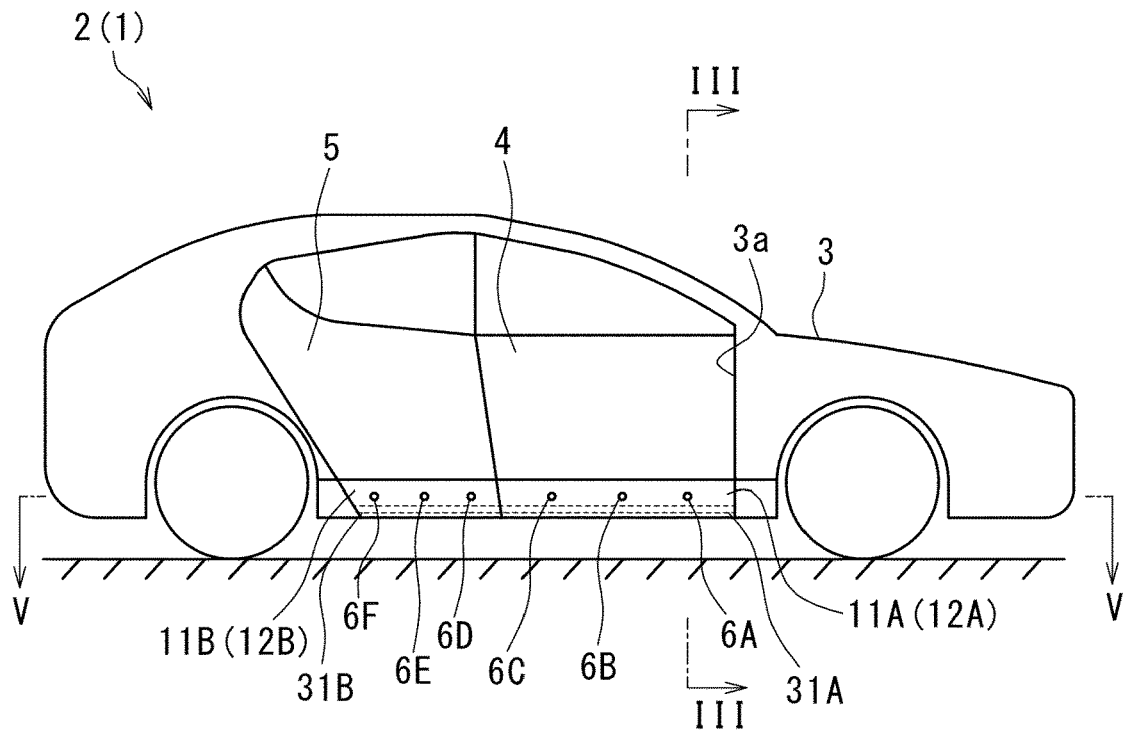
FIG. 1 shows a side view of an automobile including an ultrasonic object detection device according to a first embodiment of the present invention.
Figure 3:
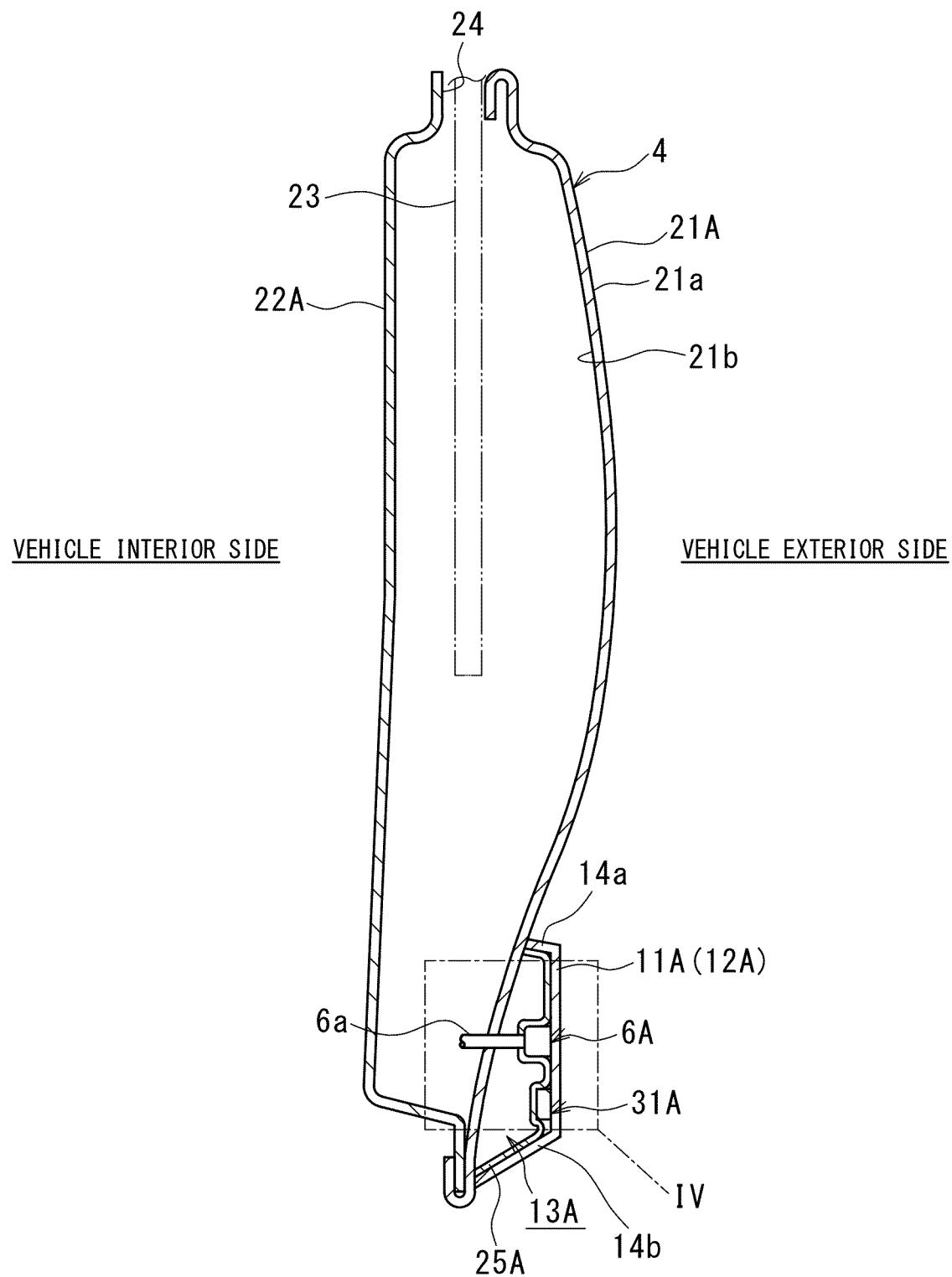
FIG. 3 shows a cross-sectional view of a door taken along line III-III in FIG. 1.
Figure 5:
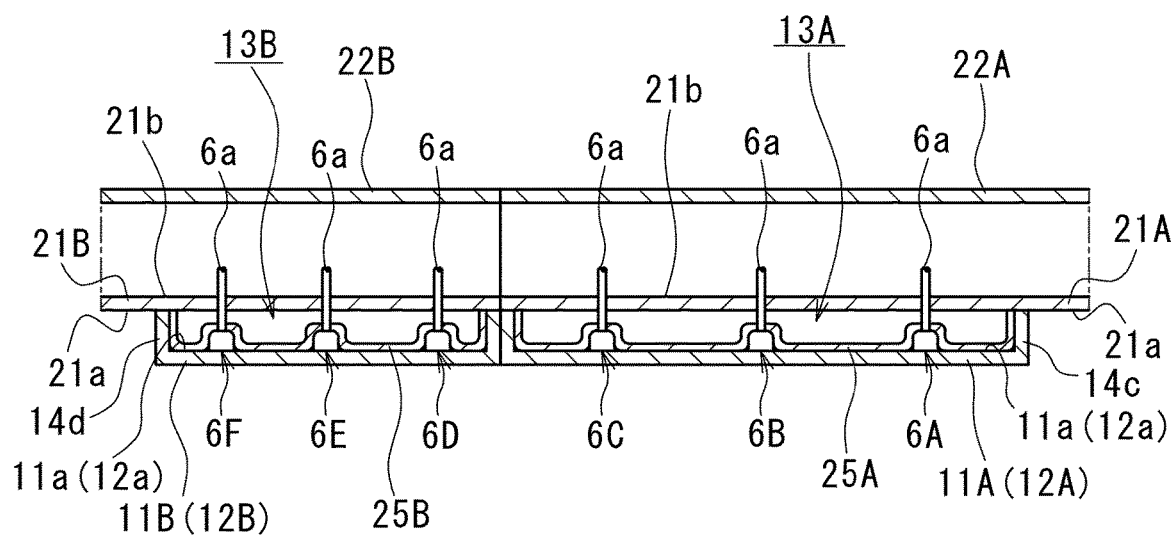
FIG. 5 shows a partial cross-sectional view of the door taken along line V-V in FIG. 1.

FIG. 1 shows an automobile 2 as an example of a vehicle including an ultrasonic object detection device 1 (hereinafter, it is simply referred to as an object detection device 1)

according to a first embodiment of the present invention. In the present embodiment, the automobile 2 includes four doors that open and close an opening part 3a of a vehicle body 3, that is, the left and right front side doors 4 and the left and right rear side doors 5. Referring also to FIGS. 3 and 5, the front side door 4 includes an outer panel 21A on the outer side of the vehicle and an inner panel 22A on the vehicle interior side. An opening 24 for raising and lowering a side window glass 23 is provided at the upper ends of the outer panel 21A and the inner panel 22A. In the present embodiment, both the outer panel 21A and the inner panel 22A of the front side door 4 are made of a steel plate. Similarly, the rear side door 5 also includes an outer panel 21B and an inner panel 22B made of a steel plate.

In the present embodiment, the automobile 2 includes the object detection device 1 for the right front side door 4 and the rear side door 5, and the object detection device 1 for the left front side door 4 and the rear side door 5. In the present embodiment, the configurations of the object detection devices 1 for the right side and the left side are the same. In the following description, the object detection device 1 for the right front side door 4 and the rear side door 5 will be described.

Figure 2:
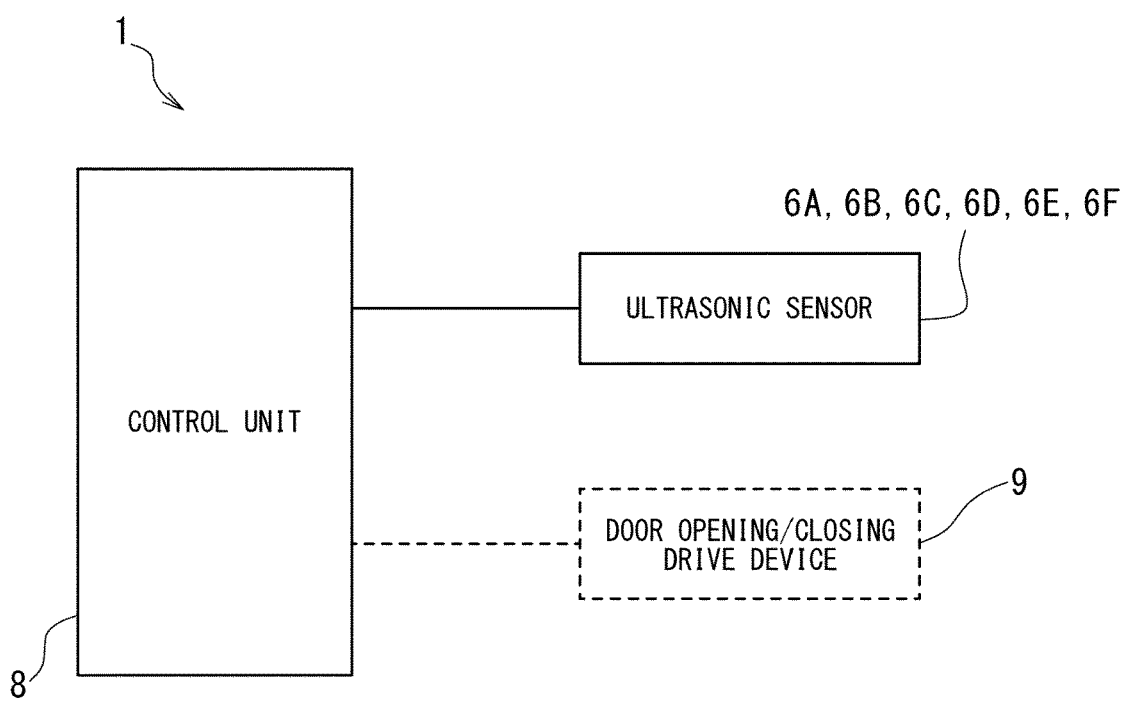
FIG. 2 shows a block diagram of an ultrasonic object detection device according to the first embodiment.

Referring also to FIG. 2, the object detection device 1 includes six ultrasonic sensors 6A to 6F and a control unit 8 (for example, an ECU) that controls the ultrasonic sensors 6A to 6F. Each of the ultrasonic sensors 6A to 6F can transmit an ultrasonic wave and receive a reflected wave of the transmitted ultrasonic wave. The ultrasonic sensors 6A to 6C are used for detecting objects around the front side door 4, and the ultrasonic sensors 6D to 6F are used for detecting objects around the rear side door 5. As described later, the ultrasonic sensors 6A to 6F are incorporated in side molds 11A and 11B attached to the outside of the vehicle body 3. The ultrasonic sensors 6A to 6F are electrically connected to the control unit 8 via a signal line 6a illustrated in FIG. 4.

The control unit 8 causes the ultrasonic sensors 6A to 6C to transmit an ultrasonic wave, and the ultrasonic wave reflected by the object is received by the ultrasonic sensors 6A to 6C. The control unit 8 detects the presence or absence of an object around the front side door 4 based on the presence or absence of reception of an ultrasonic wave by the ultrasonic sensors 6A to 6C. In addition, the control unit 8 measures the time from the transmission of the ultrasonic wave by the ultrasonic sensors 6A to 6C until the ultrasonic wave reflected by the object is received by the ultrasonic sensors 6A to 6C, and detects the distance to the object on the basis of the time. Similarly, the control unit 8 causes the ultrasonic sensors 6D to 6F to transmit ultrasonic waves, and detects the presence or absence of an object around the rear side door 5 based on the presence or absence of reception of ultrasonic waves by the ultrasonic sensors 6D to 6F. In addition, the control unit 8 detects the distance to the object based on the time from the transmission of the ultrasonic wave by the ultrasonic sensors 6D to 6F to the reception of the reflected wave by the ultrasonic sensors 6D to 6F.

Referring to FIG. 2, the control unit 8 controls a door opening/closing drive device 9 for the front side door 4 and the rear side door 5. The control unit 8 may detect the presence or absence of an object by controlling the ultrasonic sensors 6A to 6F during the opening operation of the front side door 4 and the rear side door 5 by the door opening/closing drive device 9.

Referring to FIGS. 1, 3, 4, and 5, the object detection device 1 includes a side mold 11A having a vibrating plate 12A made of resin and disposed to extend in the vehicle length direction outside the front side door 4. That is, the vibrating plate 12A is a part of the side mold 11A. In addition, the side mold 11A is disposed below the front side door 4 and is attached to an outer surface 21a of the outer panel 21A.

Figure 4:
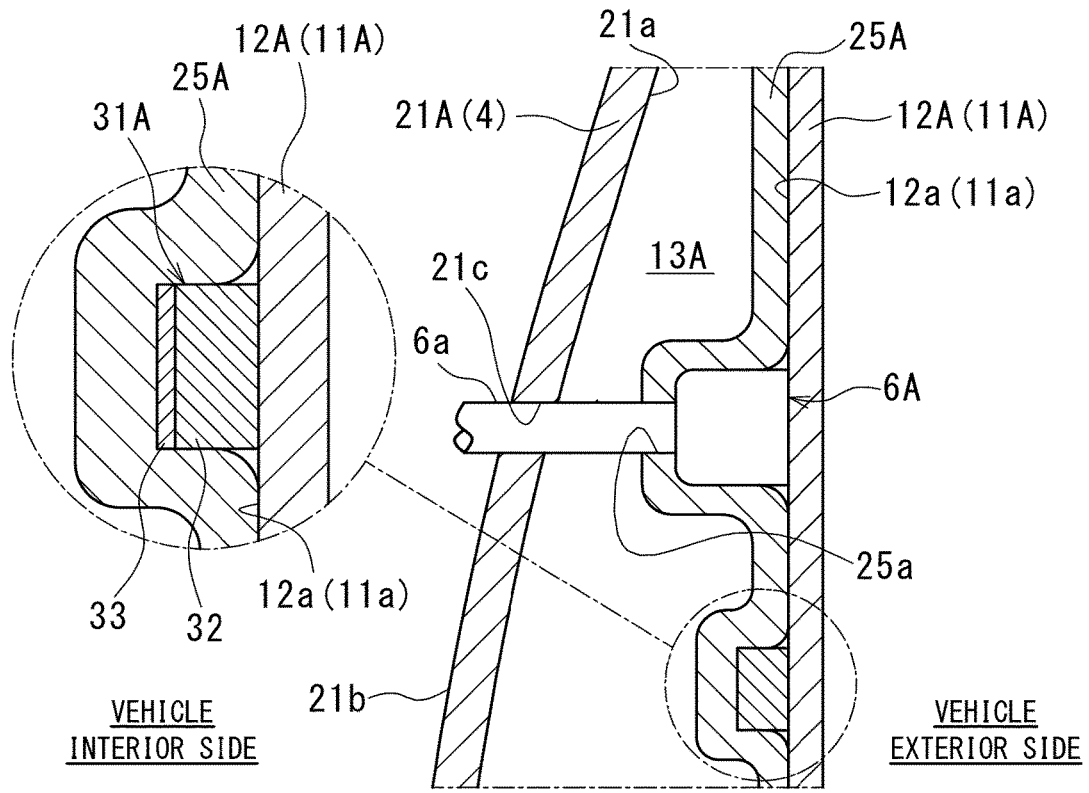
FIG. 4 shows an enlarged view of a portion IV in FIG. 3.

As illustrated in FIG. 4, the vibrating plate 12A is a plate-like member substantially parallel to the outer panel 21A, that is, a plate-like member facing the vehicle body side portion. In addition, an inner surface 12a of the vibrating plate 12A is provided apart from the outer surface 21a of the outer panel 21A. As illustrated in FIG. 3, the side mold 11A includes side walls 14a and 14b extending from the upper end and the lower end of the vibrating plate 12A toward the outer surface 21a of the outer panel 21A and having distal ends in contact with the outer surface 21a. As illustrated in FIG. 5, the side mold 11A includes side walls 14c and 14d extending from the front end and the rear end of the vibrating plate 12A in the vehicle length direction toward the outer surface 21a of the outer panel 21A, and having distal ends in contact with the outer surface 21a. Therefore, the outer surface 21a of the outer panel 21A and the inner surface 11a of the side mold 11A define a space 13A. In the space 13A, ultrasonic sensors 6A to 6C, an ultrasonic absorber 25A, and a first damping member 31A, which will be described later, are disposed. The signal line 6a extends from the space 13A to the inside of the front side door 4 through a first hole 21c provided in the front side door 4.

Similarly, referring to FIGS. 1 and 5, the object detection device 1 includes a side mold 11B having a vibrating plate 12B made of resin and disposed to extend in the vehicle length direction at a lower portion outside the rear side door 5. In addition, the outer surface 21a of the outer panel 21B and the inner surface 11a of the side mold 11B define a space 13B, and the ultrasonic sensors 6D to 6F, an ultrasonic absorber 25B, and a first damping member 31B are disposed in the space 13B.

Hereinafter, the ultrasonic sensors 6A to 6C, the ultrasonic absorber 25A, and the first damping member 31A disposed on the front side door 4 will be described. The same applies to the ultrasonic sensors 6D to 6F, the ultrasonic absorber 25B, and the first damping member 31B arranged on the rear side door 5.

Referring to FIG. 4, the ultrasonic sensors 6A to 6C are disposed in close contact with the surface of the vibrating plate 12A on the vehicle interior side, that is, the inner surface 12a. The ultrasonic sensors 6A to 6C can transmit and receive ultrasonic waves. That is, each of the ultrasonic sensors 6A to 6C transmits an ultrasonic wave and receives an ultrasonic wave reflected by an object.

With continued reference to FIG. 4, in the present embodiment, the ultrasonic absorber 25A is disposed so as to cover the entire inner surface 11a of the side mold 11A including the ultrasonic sensors 6A to 6C. In other words, the ultrasonic absorber 25A is disposed so as to cover the entire inner surface 12a of the vibrating plate 12A including the ultrasonic sensors 6A to 6C. The ultrasonic absorber 25A has a second hole 25a. The ultrasonic absorber 25A is disposed such that the signal line 6a is passed through the second hole 25a and the ultrasonic absorber 25A is in contact with the surfaces of the ultrasonic sensors 6A to 6C. In addition, the ultrasonic absorber 25A is disposed in contact with a surface of a first damping member 31A described later. In addition, the ultrasonic absorber 25A is disposed so as to be in contact with the entire inner surface 11a of the side mold 11A except for a portion where the ultrasonic sensors 6A to 6C and the first damping member 31A to be described later are in contact with the side mold 11A. Examples of the ultrasonic absorber 25A include cloth such as a nonwoven fabric, skin, resin, rubber such as silicone rubber, urethane, sponge, soundproofing paint, soundproofing material, and sound absorbing material. For example, the ultrasonic absorber 25A may be disposed so as to cover only the surfaces of the ultrasonic sensors 6A to 6C, the surface of the first damping member 31A, and the inner surface 12a of the vibrating plate 12A, that is, a part of the inner surface 11a of the side mold 11A.

With continued reference to FIG. 4, in the present embodiment, the first damping member 31A is provided in the side mold 11A. The first damping member 31A is disposed between the vibrating plate 12A and the ultrasonic absorber 25A. In addition, the first damping member 31A is disposed in close contact with the inner surface 12a of the vibrating plate 12A in the lower portion of the ultrasonic sensors 6A to 6C. As illustrated in FIG. 1, the first damping member 31A is provided over the entire length of the side mold 11A in the vehicle length direction. The first damping member 31A includes a viscoelastic body 32 (for example, made of butyl rubber) fixed in close contact with the inner surface 11a of the side mold 11A, and a thin metal plate 33 (for example, made of aluminum) disposed on the surface of the viscoelastic body 32.

Hereinafter, transmission and reception of ultrasonic waves by the object detection device 1 will be described for the front side door 4. The object detection device 1 transmits and receives an ultrasonic wave to and from the rear side door 5 in a similar manner.

The ultrasonic waves transmitted by the ultrasonic sensors 6A to 6C driven by the control unit 8 are radiated to the periphery of the front side door 4 via the vibrating plate 12A. When the emitted ultrasonic wave is reflected by the object, the reflected wave enters the vibrating plate 12A and is received by the ultrasonic sensors 6A to 6C. As described above, the control unit 8 detects the presence or absence of an object around the front side door 4 based on the presence or absence of reception of an ultrasonic wave by the ultrasonic sensors 6A to 6C. In addition, the control unit 8 measures the time from the transmission of the ultrasonic wave by the ultrasonic sensors 6A to 6C until the ultrasonic wave reflected by the object is received by the ultrasonic sensors 6A to 6C, and detects the distance to the object on the basis of the time.

The object detection device 1 has the following features with respect to the ultrasonic sensors 6A to 6C for the front side door 4.

In general, transverse waves are less likely to remain in a resin material. In the present embodiment, since the ultrasonic sensors 6A to 6C are attached to the vibrating plate 12A made of resin, transverse waves of ultrasonic waves transmitted by the ultrasonic sensors 6A to 6C hardly remain on the vibrating plate 12A. Therefore, interference between the reflected wave (longitudinal wave) reaching the vibrating plate 12A and the transverse wave remaining on the vibrating plate 12A is suppressed or prevented, and the ultrasonic sensors 6A to 6C can reliably receive the reflected wave.

In addition, since the ultrasonic absorber 25A is provided on the inner surface 12a of the vibrating plate 12A, it is possible to prevent an ultrasonic wave traveling toward the inside (door side) of the vibrating plate 12A among ultrasonic waves generated by the vibration of the vibrating plate 12A from being reflected by the front side door 4 and received by the vibrating plate 12A. That is, erroneous detection can be prevented. As described above, it is possible to reliably detect an object around the vehicle without providing a damping member for attenuating a transverse wave in the vibrating plate 12A, that is, while simplifying the configuration of the ultrasonic object detection device.

In addition, the ultrasonic sensors 6A to 6C receive reflected waves incident on portions of the vibrating plate to which the ultrasonic sensors 6A to 6C are attached. In addition, the reflected waves incident on portions of the vibrating plate other than the portions where the ultrasonic sensors 6A to 6C are attached also propagate through the vibrating plate and reach the ultrasonic sensors 6A to 6C, and are received by the ultrasonic sensors 6A to 6C. That is, since the reflected wave can be received by the entire vibrating plate, the reception sensitivity of the reflected wave can be improved.

In addition, when the ultrasonic sensors 6A to 6C transmit ultrasonic waves via the vibrating plate 12A, the vibration of the lower portion of the vibrating plate 12A is suppressed by the first damping member 31A, and the ultrasonic waves can be suppressed from traveling downward. In addition, when the ultrasonic wave is reflected by the obstacle and received by the ultrasonic sensors 6A to 6C via the vibrating plate 12A, vibration due to the ultrasonic wave received on the lower side of the vibrating plate 12A can be suppressed by the first damping member 31A. As described above, when there is an obstacle such as a curb on the lower side of the front side door 4, it is possible to avoid the ultrasonic sensors 6A to 6C from erroneously detecting the obstacle.

The ultrasonic sensors 6A to 6C are attached to the inner surface 12a of the vibrating plate 12A and cannot be seen from the outside. Therefore, it is possible to detect an object by ultrasonic waves without impairing the appearance or design of the automobile. In addition, since the vibrating plate 12A is a part of the side mold 11A, in the case of a vehicle equipped with the side mold 11A as standard, the ultrasonic sensors 6A to 6C can be installed without newly providing the vibrating plate 12A on the front side door 4.

As described above, according to the ultrasonic object detection device of the present embodiment, it is possible to reliably detect an object while simplifying the configuration.

The above features also apply to the ultrasonic sensors 6D to 6F for the rear side door 5.

Second Embodiment

Figure 6:
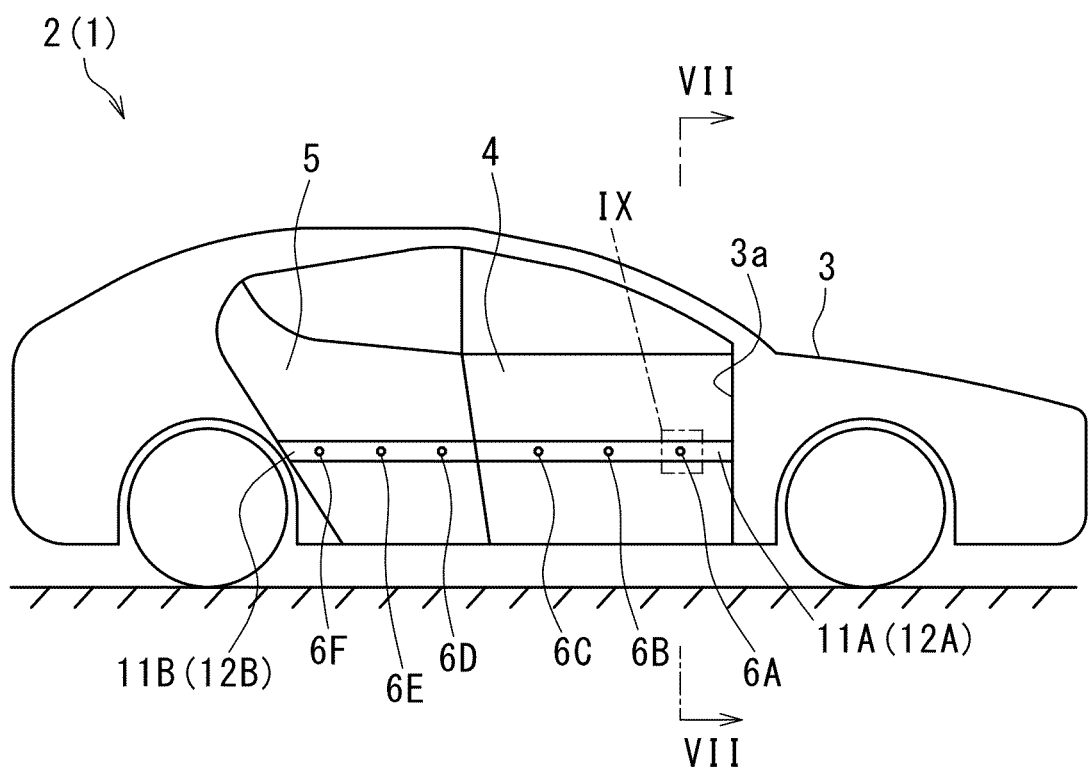
FIG. 6 shows a side view of an automobile including an ultrasonic object detection device according to a second embodiment of the present invention.
Figure 7:
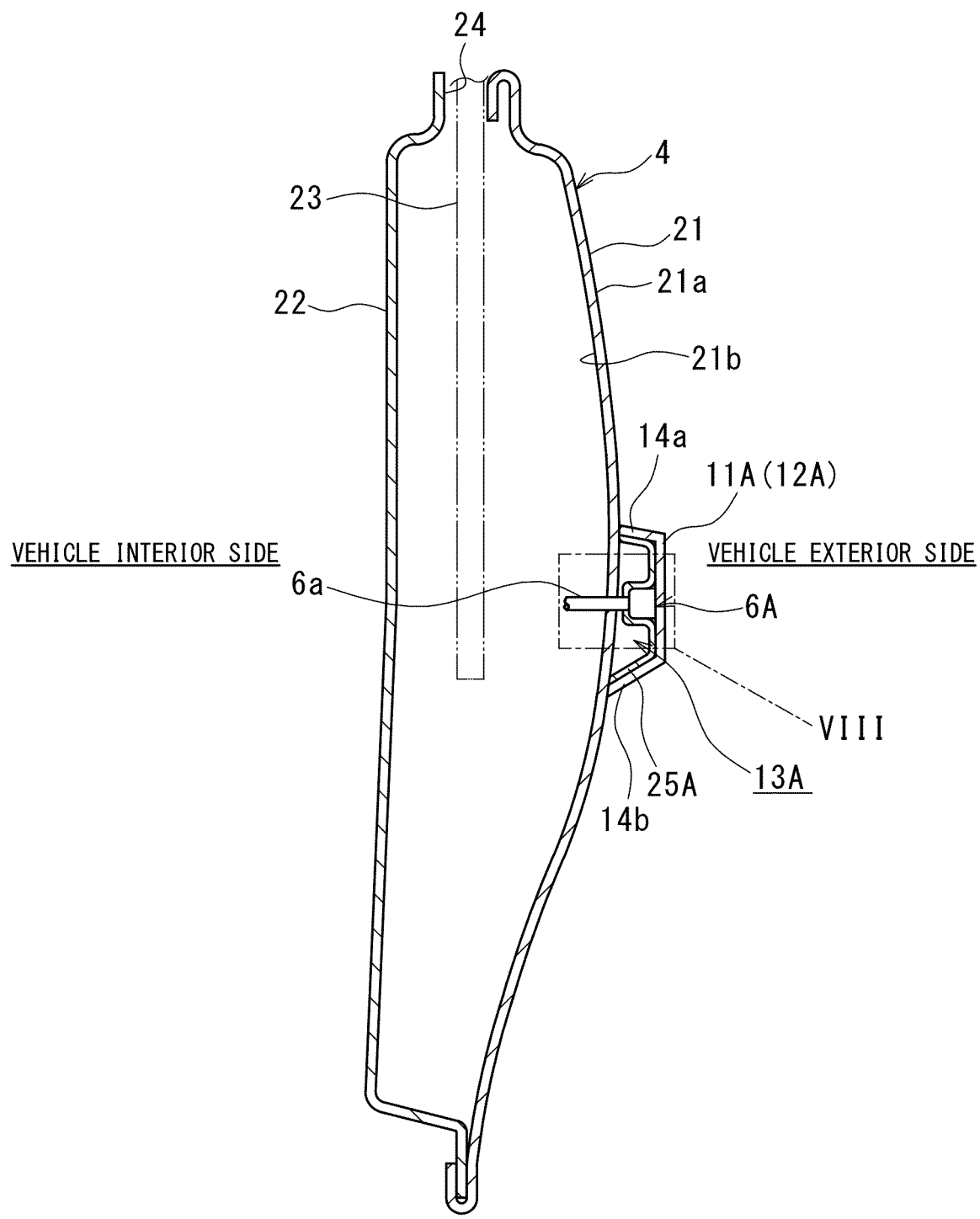
FIG. 7 shows a cross-sectional view of the door taken along line VII-VII in FIG. 6.
Figure 8:
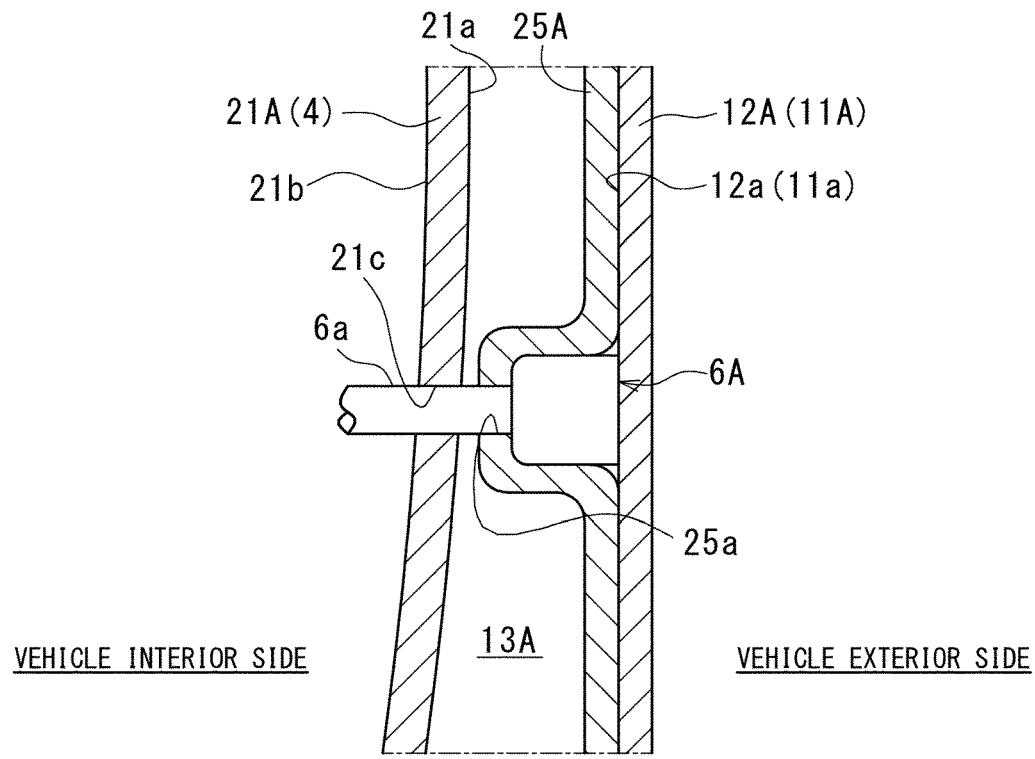
FIG. 8 shows an enlarged view of a portion VIII in FIG. 7.

FIGS. 6 to 8 show a second embodiment of the present invention. The second embodiment is the same as the first embodiment with respect to points not specifically mentioned.

In the object detection device 1 according to the second embodiment, the side mold 11A attached to the outer surface 21a of the outer panel 21A of the front side door 4 is provided substantially at the center of the front side door 4 in the vehicle height direction. In addition, the object detection device 1 of the front side door 4 is not provided with the first damping member 31A. Similarly, the side mold 11B in which the first damping member 31B is not provided is provided at a substantially central portion of the rear side door 5 in the vehicle height direction.

The object detection device 1 has the following features with respect to the ultrasonic sensors 6A to 6C for the front side door 4.

In the object detection device 1 according to the second embodiment, the side mold 11A is provided in a substantially central portion of the front side door 4 in the vehicle height direction. Therefore, even when there is an obstacle such as a curbstone on the lower side of the front side door 4, there is no risk of erroneous detection of the obstacle since the distance between the side mold 11A and the obstacle is sufficiently secured.

As described above, in the object detection device 1 according to the second embodiment, the configuration of the object detection device 1 can be further simplified.

The above features also apply to the ultrasonic sensors 6D to 6F for the rear side door 5.

Third Embodiment

Figure 9:
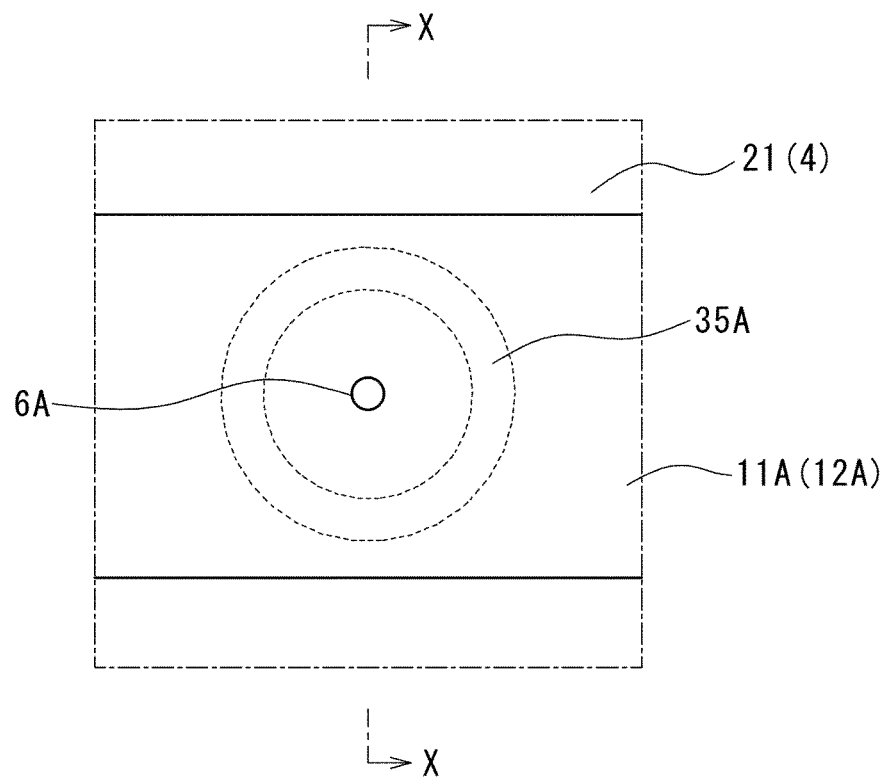
FIG. 9 shows an enlarged view of a portion IX in FIG. 6 of an ultrasonic object detection device according to a third embodiment of the present invention.
Figure 10:
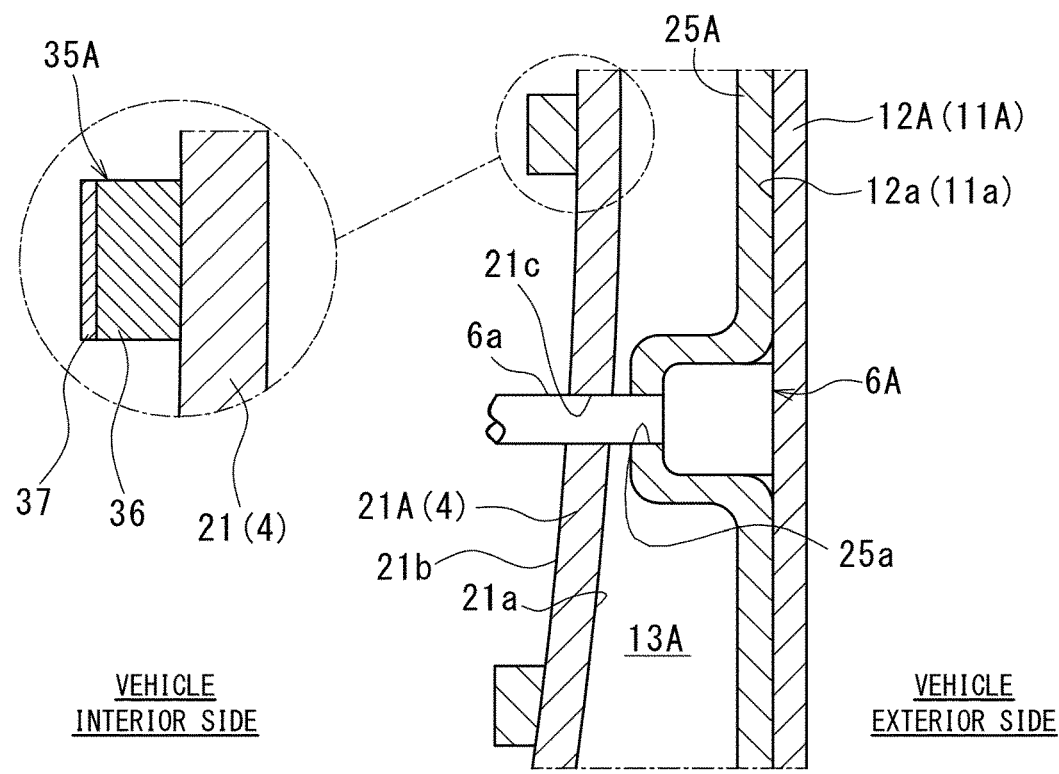
FIG. 10 shows a cross-sectional view taken along line X-X in FIG. 9.

FIGS. 9 and 10 illustrate a third embodiment of the present invention. The third embodiment is the same as the second embodiment with respect to points not particularly mentioned.

The object detection device 1 according to the third embodiment further includes an annular second damping member 35A disposed on the outer panel 21A of the front side door 4 in a portion facing the vibrating plate 12A. Specifically, the second damping member 35A is disposed on an inner surface 21b of the outer panel 21A.

Similarly to the front side door 4, an annular second damping member 35B is provided on the inner surface 21b of the outer panel 21B of the rear side door 5. Hereinafter, the third embodiment will be further described by taking the ultrasonic sensors 6A to 6C of the front side door 4 as an example, but the rear side door 5 has the same configuration.

The second damping member 35A is disposed on the inner surface 21b of the outer panel 21A of the front side door 4 such that the ultrasonic sensor 6A is positioned substantially at the center of the second damping member 35A in plan view. In addition, in plan view of the outer panel 21A, the second damping member 35A is disposed on the outer panel so as to surround the ultrasonic sensor 6A at an interval. Similarly, the second damping member 35A is disposed for each of the ultrasonic sensors 6B and 6C. That is, three second damping members 35A are provided on the outer panel 21A.

The second damping member 35A includes a viscoelastic body 36 (for example, made of butyl rubber) and a thin metal plate 37 (for example, made of aluminum) disposed on the surface of the viscoelastic body 36. The viscoelastic body 36 of the second damping member 35A is fixed in close contact with the inner surface 21b of the outer panel 21A. The second damping member 35A may have a rectangular shape.

The object detection device 1 has the following features with respect to the ultrasonic sensors 6A to 6C for the front side door 4.

In the third embodiment, when the vibrating plate 12A vibrates due to the ultrasonic waves generated by the ultrasonic sensors 6A to 6C and the vibration is transferred to the outer panel 21A of the front side door 4 via a connection portion between the vibrating plate 12A and the outer panel 21A of the front side door 4, the vibration of the outer panel 21A can be suppressed. Specifically, the vibration of the outer panel 21A can be suppressed in the region where the annular second damping member 35A is disposed and the region inside the region. Therefore, generation of an ultrasonic wave due to vibration of the outer panel 21A can be suppressed, and the ultrasonic sensors 6A to 6C can be suppressed from receiving the ultrasonic wave generated in the outer panel 21A. Therefore, the obstacle detection accuracy of the ultrasonic sensors 6A to 6C can be improved.

In addition, since the second damping member 35A is disposed on the inner surface 21b of the outer panel 21A, the second damping member 35A can be attached even when the interval between the vibrating plate 12A and the outer surface 21a of the outer panel 21A is narrow.

The above features also apply to the ultrasonic sensors 6D to 6F for the rear side door 5.

Figure 11:
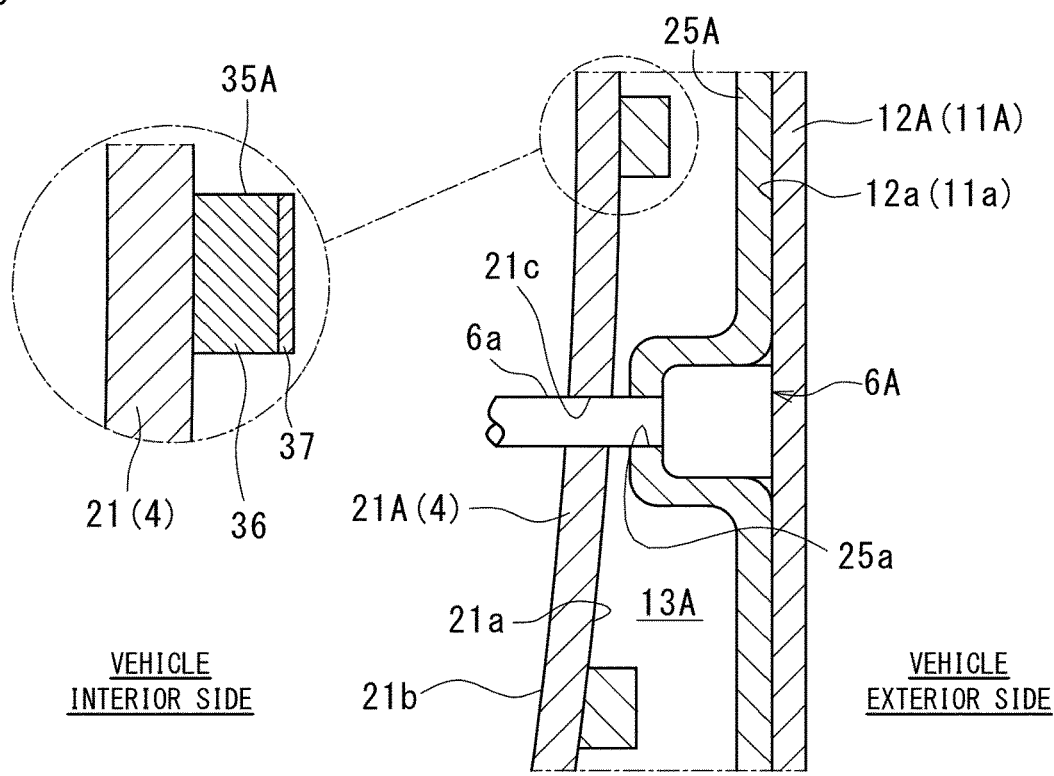
FIG. 11 shows a cross-sectional view similar to FIG. 10 illustrating a modification of the third embodiment of the present invention.

As illustrated in FIG. 11, in the modification of the third embodiment, the second damping member is disposed on the outer surface 21a of the outer panel 21A.

By providing the second damping member 35A on the outer surface 21a of the outer panel 21A, the second damping member 35A can be attached simultaneously when the side mold 11A is attached to the front side door 4.

Although the present invention has been described by taking a revolving side door as an example, the present invention is also applicable to a door other than a revolving door such as a gull-wing door, and is also applicable to a door other than a side door such as a rear door.

The invention claimed is:

1. An ultrasonic object detection device comprising:
   a vibrating plate that is made of resin, and disposed at a lower portion of a door to extend in a vehicle length direction outside the door that opens and closes an opening part of a vehicle body;
   an ultrasonic sensor disposed on an inner surface of the vibrating plate and capable of transmitting and receiving an ultrasonic wave;
   an ultrasonic absorber disposed so as to cover the inner surface of the vibrating plate, including the ultrasonic sensor; and
   a first damping member disposed on a portion of the inner surface of the vibrating plate, the portion being located below the ultrasonic sensor.

2. The ultrasonic object detection device according to claim 1, further comprising a second damping member disposed on an outer panel of the door in a portion facing the inner surface of the vibrating plate.

3. The ultrasonic object detection device according to claim 2, wherein the second damping member is disposed on an outer surface of the outer panel so as to face the inner surface of the vibrating plate.

4. The ultrasonic object detection device according to claim 2, wherein the second damping member is disposed on an inner surface of the outer panel so as to face the inner surface of the vibrating plate through an outer surface of the outer panel.

5. The ultrasonic object detection device according to claim 1, wherein the vibrating plate is a part of a side mold, and the ultrasonic absorber is disposed in close contact with the side mold.

6. An ultrasonic object detection device comprising:
   a vibrating plate that is a part of side mold, made of resin, and disposed to extend in a vehicle length direction outside an outer panel of a door that opens and closes an opening part of a vehicle body;
   an ultrasonic sensor disposed on an inner surface of the vibrating plate and capable of transmitting and receiving an ultrasonic wave;
   an ultrasonic absorber disposed so as to cover the inner surface of the vibrating plate including the ultrasonic sensor; and
   a second damping member disposed on the outer panel of the door in a portion facing the inner surface of the vibrating plate.

7. The ultrasonic object detection device according to claim 6, wherein the second damping member is disposed on an outer surface of the outer panel so as to face the inner surface of the vibrating plate.

8. The ultrasonic object detection device according to claim 6, wherein the second damping member is disposed on an inner surface of the outer panel so as to face the inner surface of the vibrating plate through an outer surface of the outer panel.

9. The ultrasonic object detection device according to claim 6, wherein the ultrasonic absorber is disposed in close contact with the side mold.

10. An ultrasonic object detection device comprising:
a vibrating plate that is made of resin, and disposed to extend in a vehicle length direction outside a door that opens and closes an opening part of a vehicle body;
an ultrasonic sensor disposed on an inner surface of the vibrating plate and capable of transmitting and receiving an ultrasonic wave; and
an ultrasonic absorber disposed so as to cover the inner surface of the vibrating plate, including the ultrasonic sensor, wherein
the vibrating plate is a part of a side mold, and
the ultrasonic absorber is disposed in close contact with the side mold.

\* \* \* \* \*